(12) United States Patent
Meyer

(10) Patent No.: US 6,397,299 B1
(45) Date of Patent: *May 28, 2002

(54) REDUCED LATENCY MEMORY CONFIGURATION METHOD USING NON-CACHEABLE MEMORY PHYSICALLY DISTINCT FROM MAIN MEMORY

(75) Inventor: James W. Meyer, Shoreview, MN (US)

(73) Assignee: Micron Technology, Inc., Boise, ID (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/009,911

(22) Filed: Feb. 21, 1998

(51) Int. Cl.[7] ............................................... G06F 12/08
(52) U.S. Cl. ...................................... 711/138; 711/170
(58) Field of Search ................................. 345/501, 519, 345/520, 521, 508, 512, 530, 536, 541; 711/118, 138, 139, 167, 170

(56) References Cited

U.S. PATENT DOCUMENTS

| | | | |
|---|---|---|---|
| 4,797,850 A | 1/1989 | Amitai | 364/900 |
| 4,903,239 A | 2/1990 | Akashi | 365/189.01 |
| 5,161,218 A * | 11/1992 | Catlin | 711/2 |
| 5,249,160 A | 9/1993 | Wu et al. | 365/230.08 |
| 5,317,709 A | 5/1994 | Sugimoto | 395/425 |
| 5,325,504 A * | 6/1994 | Tipley et al. | 711/128 |
| 5,388,073 A | 2/1995 | Usami et al. | 365/230.03 |
| 5,434,969 A * | 7/1995 | Heilveil et al. | 345/501 |
| 5,477,488 A | 12/1995 | Subramani | 365/189.02 |
| 5,546,352 A | 8/1996 | Sato et al. | 365/230.06 |
| 5,583,822 A | 12/1996 | Rao | 365/230.03 |
| 5,586,286 A | 12/1996 | Santeler et al. | 395/432 |
| 5,602,771 A | 2/1997 | Kajigaya et al. | 365/51 |
| 5,638,532 A | 6/1997 | Frame et al. | 711/154 |
| 5,659,715 A * | 8/1997 | Wu et al. | 711/170 |
| 5,818,464 A * | 10/1998 | Wade | 345/501 |
| 5,909,696 A * | 6/1999 | Reinhardt et al. | 711/144 |
| 6,003,120 A * | 12/1999 | Hardin | 711/169 |
| 6,178,481 B1 * | 1/2001 | Krueger et al. | 711/122 |

* cited by examiner

*Primary Examiner*—Do Hyun Yoo
*Assistant Examiner*—Gary J. Portka
(74) *Attorney, Agent, or Firm*—Dosey & Whitney LLP

(57) ABSTRACT

The present invention relates to a method in a computer system, for configuring a memory subsystem, comprising selecting a subset of main memory, integrating the subset of main memory within the computer system such that the subset is physically distinct from the main memory and configuring the subset of main memory as noncacheable memory.

20 Claims, 4 Drawing Sheets

REDUCED LATENCY MEMORY CONFIGURATION METHOD USING NON-CACHEABLE MEMORY PHYSICALLY DISTINCT FROM MAIN MEMORY

This application is related to, and incorporates by reference, an application titled "System Controller with Integrated Low Latency Memory" filed on even date herewith, Ser. No. 09/010,250.

1. FIELD OF THE INVENTION

The present invention relates generally to memory subsystems in electronic devices. More particularly, the present invention relates to reducing latency in memory subsystems.

2. BACKGROUND OF THE INVENTION

Computer systems typically comprise at least one processor, a memory subsystem, at least one system controller and one or more peripherals (such as PCI devices) operably connected by various buses, including a host bus operably connected between the processor and the system controller. The processor may include an internal level one (L1) cache. The memory subsystem typically comprises system or main memory external to both the processor and the system controller and a level two (L2) cache internal to the system controller. Together, the L1 cache and the memory subsystem (L2 cache and main memory) comprise a memory hierarchy.

The system controller includes logic for, in conjunction with the processor and peripheral devices, controlling the transfer of data and information between the processor and peripheral devices and the memory subsystem. For example, if a processor issues a read transaction, the processor will determine whether the requested data is stored in the L1 cache. If the read request is a "miss" in the L1 cache, during a subsequent clock cycle, the system controller will determine whether the requested data is stored in the L2 cache. If the read request is a miss in the L2 cache, during yet another subsequent clock cycle, the system controller will attempt to access the requested data in the main memory. At this point, given the relatively larger size of main memory, the slower speed of main memory, and the distance of main memory from the CPU, a number of clock cycles may be required decode the address of the read request and access the requested data in the main memory.

Thus, when accessing main memory (after L1 and L2 cache misses), the computer system experiences a relative degree of latency. This latency may be increased in multi-processor/multi-controller systems, wherein each processor and each system controller may have a respective L1 and L2 cache. In order to preserve coherency between the respective L1 and L2 caches and the main memory, respective L1 and L2 cache controllers must monitor buses within the computer system (typically the host bus) to determine if another processor or peripheral device has modified data in an L1 cache, L2 cache or main memory. If modifications have been made, the caches and main memory must be updated accordingly. Monitoring the memory hierarchy in this manner may be referred to as snooping. A snoop operation requires at least one clock cycle to perform, thus adding to the relative degree of latency within these types of computer systems.

To deal with the latency (i.e., to prevent transactions that may "interfere" with the memory access request until the memory access request has been completed), the computer system may interrupt, stall or insert a number of wait states into various operations and transactions. This results in a relatively slower computer system with relatively slower processing and reduced computer system throughput. Operating such a computer system is relatively time consuming and costly.

Thus, there exists a need in the art for apparatus and methods for reducing the inherent latency in accessing memory subsystem.

In still other computer systems, a system controller may have an internal or "embedded" peripheral. In these computer systems, the embedded peripheral is an integral component of the system controller. The embedded peripheral may be a "secondary" processor (i.e., a processor without the power, capabilities and intelligence of the main or external processor) and may be utilized to relieve the computational burden on the main processor. Because these embedded peripherals lack the sophistication of the main processor (or, for that matter, most external peripherals), in current computer systems, the embedded peripheral cannot access the memory subsystem. As such, in current computer systems, the embedded peripheral must be provided with a dedicated memory exclusively utilized by the embedded peripheral. In current computer systems, this embedded peripheral dedicated memory is external to the system controller or "off chip". Providing this dedicated memory "off chip" adds latency to embedded peripheral's memory accesses and consumes valuable space within the computer system. Additionally, the exclusivity of the dedicated memory decreases the versatility of the computer system.

Thus, there exists a need in the art for apparatus and methods for reducing latency in embedded peripheral dedicated memory accesses and for increasing the versatility of embedded peripheral dedicated memory.

3. SUMMARY OF THE INVENTION

The present invention relates to a method in a computer system, for configuring a memory subsystem, comprising selecting a subset of main memory, integrating the subset of main memory within the computer system such that the subset is physically distinct from the main memory and configuring the subset of main memory as noncacheable memory.

4. BRIEF DESCRIPTION OF THE DRAWINGS

For a more complete understanding of the present invention, and the advantages thereof, reference is now made to the following description taken in conjunction with the accompanying drawings, in which.

Figure 1:
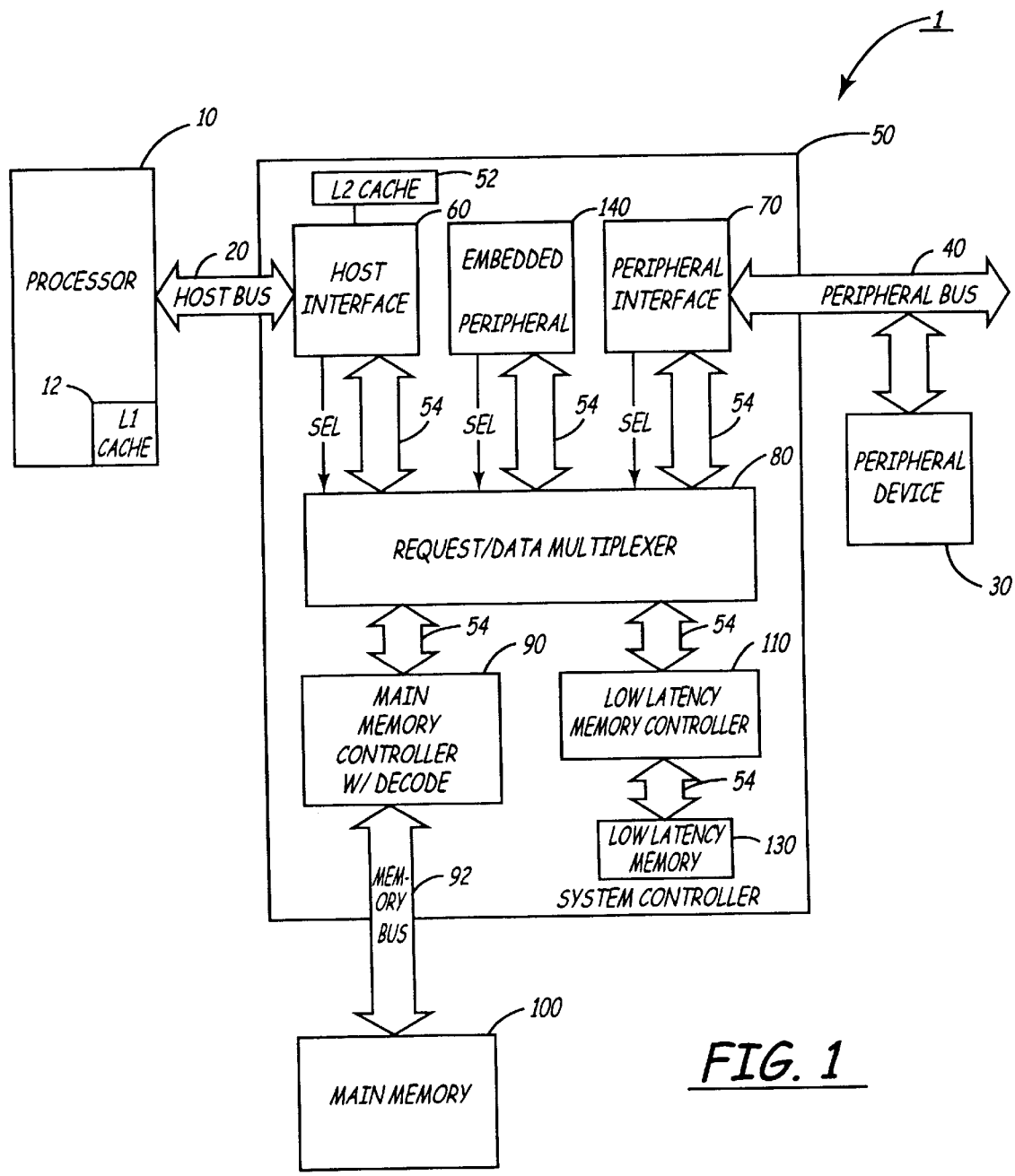
FIG. 1 is a block diagram of a computer system that uses the present invention.

5. DETAILED DESCRIPTION OF THE INVENTION 5.1 Description of a First Embodiment In FIG. 1, there is shown a computer system 1 comprising an embodiment of the present invention. Generally, FIG. 1 illustrates a computer system 1 comprising a processor 10, a system controller 50 with an integrated low latency memory 130, a peripheral device 30 and a main memory 100. The low latency memory 130 may be considered a subset of the address space primarily embodied in main memory 100, although within the computer system 1 it is physically distinct from the main memory 100. Unlike a cache, the low latency memory 130 is not intended to mirror any portion of main memory 100. Instead it represents a unique subset of the main memory. Accordingly, in the present invention, the low latency memory 130 is a unique component of the memory subsystem.

5.1.1 Processor

FIG. 1 illustrates a uni-processor computer system, although the present invention may be equally beneficial in multi-processor computer systems. The processor 10 may be any conventional general purpose single- or multi-chip processor such as a Pentium® Pro processor, a Pentium® processor, a 8051 processor, a MIPS® processor, a Power PC® processor, or an ALPHA® processor. In addition, the processor 10 may be any conventional special purpose processor such as a digital signal processor or a graphics processor. The processor 10 may have an integrated level one (L1) cache 12. As shown in FIG. 1, the processor 10 may be operably connected to a host bus 20. When the processor 10 accesses the memory subsystem (or other portions of the computer system), the processor 10 may be referred to as a requesting agent.

5.1.2 Peripheral Device

FIG. 1 illustrates a computer system with a single peripheral device 30, although the present invention may be equally beneficial in computer systems comprising a plurality of peripheral devices. The peripheral device 30 may be a PCI-based device or an other type of I/O device. As shown in FIG. 1, the peripheral device 30 may be operably connected to a peripheral bus 40. When the peripheral device 30 accesses the memory subsystem (or other portions of the computer system), the peripheral device 30 may also be referred to as a requesting agent.

5.1.3 Main Memory

The main memory 100 may be one or more conventional memory devices including, without limitation, dynamic random access memories (DRAMs), extended data out DRAMs (EDO DRAMs), burst extended data out DRAMs (BEDO DRAMs), static random access memories (SRAMs), video random access memories (VRAMs), read-only memories (ROMs), electrically erasable programmable read-only memories (EEPROMs), and erasable programmable read-only memories (EPROMs). The memory device may be provided in multi-chip modules (e.g., SIMM or SIP). The main memory 100 may be cached or cacheable memory; i.e., portions of the data or information stored in the main memory 100 may also be stored in the L1 cache 12 of the processor 10 or in the L2 cache 52 of the system controller 50. Because the main memory 100 is cacheable, a snoop phase or cycle must be implemented whenever a processor 10 or peripheral device 30 attempts to access a main memory address. The main memory 100 may be operably connected to the system controller 50 by a main memory bus 92.

5.1.4 System Controller with Low Latency Memory

The system controller 50 may also be referred to as system or core logic 50. The system controller 50 may be an application specific integrated circuit (ASIC). Generally, the system controller 50 operates to control the memory subsystem within the computer system (including the main memory 100 and the low latency memory 130) in response to memory access requests received by the system controller 50. The system controller 50 coordinates the transfer of data to and from the main memory 100 and the low latency memory 130 across the host bus 20, peripheral bus 40 and memory bus 92. Generally, the system controller 50 may handle and schedule multiple requests from various buses via bus arbitration control circuitry (not shown).

The various integrated components of the system controller 50 may be operably connected to an internal system controller bus 54. The internal system controller bus 54 may have its own proprietary or a standard bus protocol.

5.1.4.1 Host Interface, I/O Interface and Request/Data Multiplexer

The system controller 50 comprises a host interface 60, a peripheral interface 70 and a request/data multiplexer 80. The system controller may also comprise an L2 cache 52. The host interface 60 may receive data and address information from the processor 10 over the host bus 20. The host interface 60 may decode an address received from the processor 10 to determine if the requested address is within main memory 100 or within low latency memory 130. If the requested address is within the low latency memory 130, the host interface 60 may assert a select signal (SEL) causing the request/data multiplexer 80 to provide the address request and any data associated with the address request to the low latency memory controller 110. Otherwise, the address request and any data associated with the address request may be provided to the main memory controller 90.

Similarly, the peripheral interface 70 may receive data and address information from the peripheral device 30 over the peripheral bus 40. The peripheral interface 70 may decode an address received from the peripheral device 30 to determine if the requested address is within main memory 100 or within low latency memory 130. If the requested address is within the low latency memory 130, the peripheral interface 70 may assert a select signal (SEL) causing the request/data multiplexer 80 to provide the address request and any data associated with the request to the low latency memory controller 110. Otherwise, the address request and any data associated with the request may be provided to the main memory controller 90.

5.1.4.2 Embedded Peripheral

The embedded peripheral 140 may be a digital signal processor (DSP) such as a 56000 series DSP manufactured by Motorola™. When the embedded peripheral 140 accesses the memory subsystem (or other portions of the computer system), the embedded peripheral may also be referred to as a requesting agent. The embedded peripheral 140 may be utilized to relieve the computational burden on the processor 10. The embedded peripheral 140 may assert a select signal (SEL) to access the low latency memory 130. Because all of the data and information required by the embedded peripheral may be stored in low latency memory 130 (that is, the embedded peripheral 140 will have no off chip or other memory space available to it), the select signal line of the embedded peripheral may be hardwired to the low latency memory controller 110, thereby allowing the embedded peripheral direct access to the low latency memory 130. Latency in direct memory accesses to the low latency memory 130 is reduced by having the memory on which the embedded peripheral 140 is exclusively dependent on the same "chip" or physical component as the embedded peripheral 140. In the present invention, the embedded peripheral 140 and the low latency memory 130 may be on the same system controller ASIC 50.

5.1.4.3 Main Memory Controller

The main memory controller 90 generates the control signals necessary to control the main memory 100 in response to main memory access requests provided by the request data multiplexer 80. The main memory controller 90 may perform address decoding operations to determine the location in main memory 100 of the access request.

5.1.4.4 Low Latency Memory Controller

Figure 2:
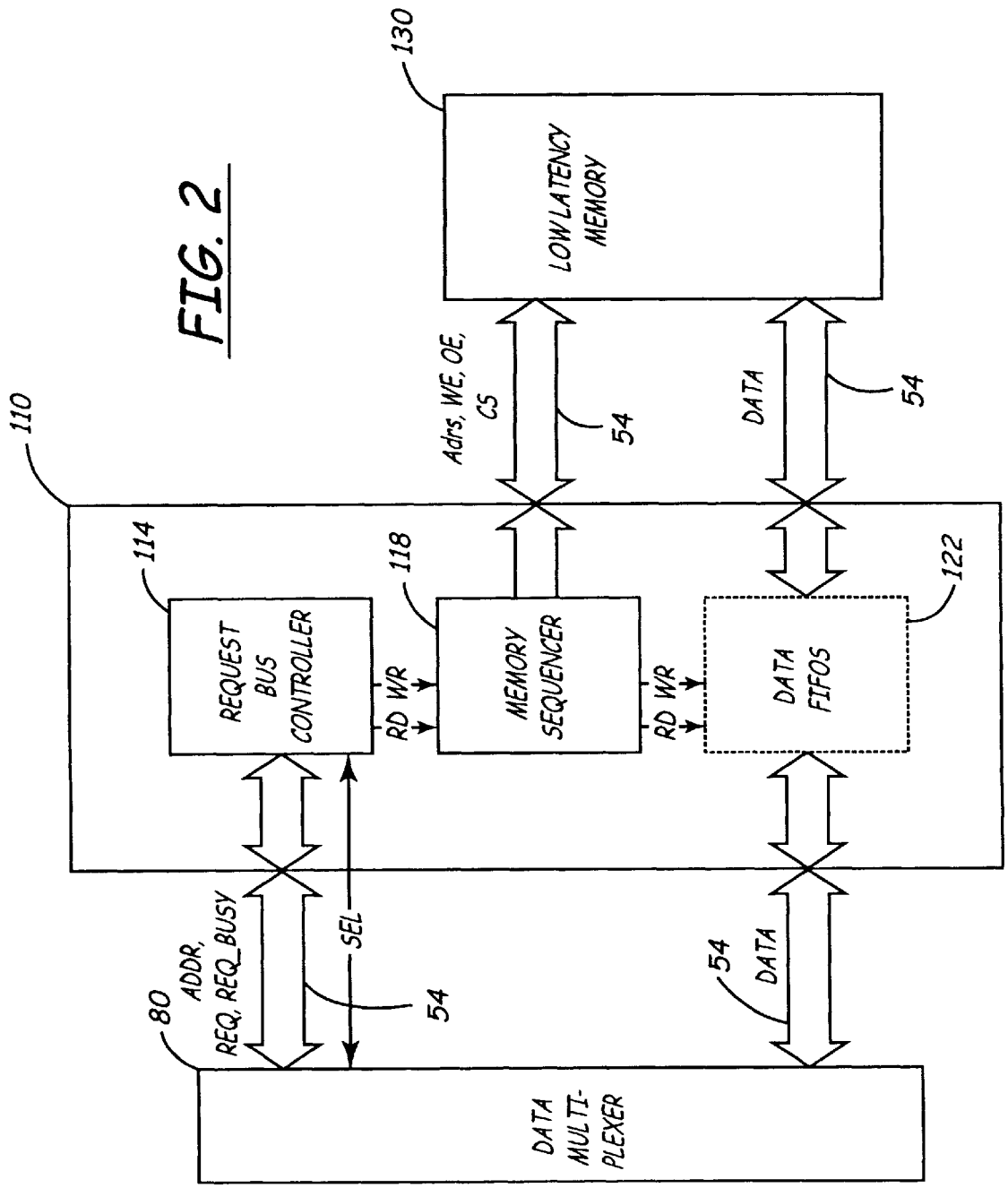
FIG. 2 is a block diagram of the low latency memory controller illustrated in FIG. 1.

The low latency memory controller 110 generates the control signals necessary to control the low latency memory 130 in response to low latency memory access requests provided by the request data multiplexer 80. As shown in FIG. 2, the low latency memory controller 110 comprises a request bus controller 114, a memory sequencer 118 and an optional data buffer 122.

5.1.4.5 Low Latency Memory

The low latency memory 130 together with the L2 cache 52 and the main memory 100 comprise the memory subsystem. The low latency memory 130 may be one or more conventional memory devices including, without limitation, dynamic random access memories (DRAMs), extended data out DRAMs (EDO DRAMs), burst extended data out DRAMs (BEDO DRAMs), static random access memories (SRAMs), video random access memories (VRAMs), read-only memories (ROMs), electrically erasable programmable read-only memories (EEPROMs), and erasable programmable read-only memories (EPROMs). In one embodiment, the low latency memory may be 1 megabyte.

At The low latency memory 130 is a subset of the address space primarily embodied in the main memory 100; however, the low latency memory 130 is an integral component of the system controller 50 and thus physically distinct from the main memory 100. Because the low latency memory 130 is an integral component of the system controller 50 (i.e., integrated on the same chip), latency is reduced in accessing the low latency memory 130 as compared to accessing the main memory 100 (which is external to the system controller 50). (Generally, transmitting a signal from one chip or computer system component to another results in latency because of the propagation delay involved in transmitting the signal). Latency is further reduced in accessing low latency memory 130 as compared to accessing main memory 100 because, given the relatively smaller size of the low latency memory 130, address requests to the low latency memory 130 may require fewer clock cycles to decode. Latency may be even further reduced in accessing low latency memory 130 by configuring the low latency memory as noncacheable memory, thus avoiding the need to snoop the L1 cache, L2 cache or low latency memory 130 for data modifications when low latency memory 130 is addressed. Additionally, configuring or manufacturing the low latency memory as SRAM (as compared to main memory DRAM) may also reduce latency).

5.2 Alternative Embodiments

Figure 3:
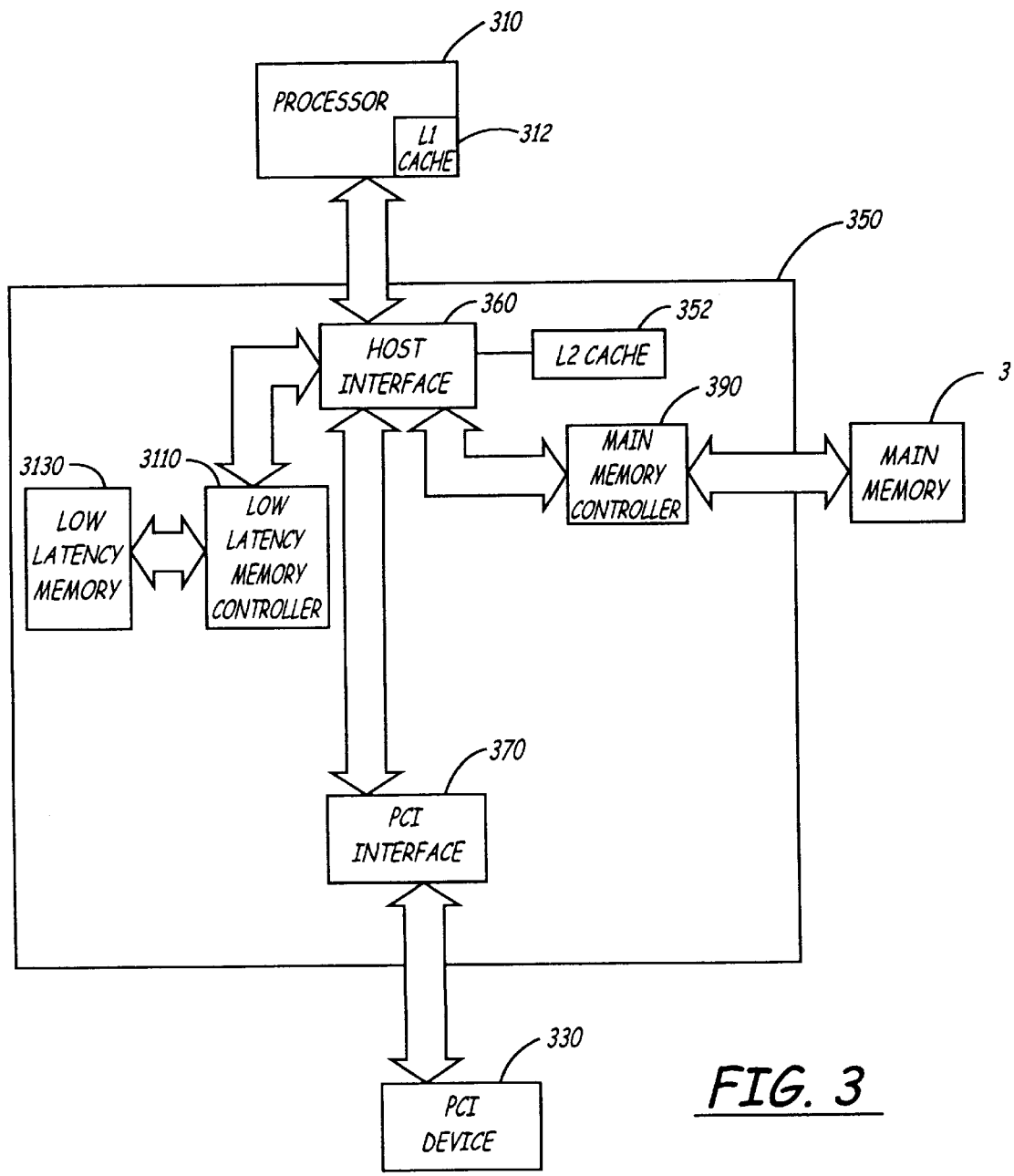
FIG. 3 is a block diagram of another computer system that uses the present invention.
Figure 4:
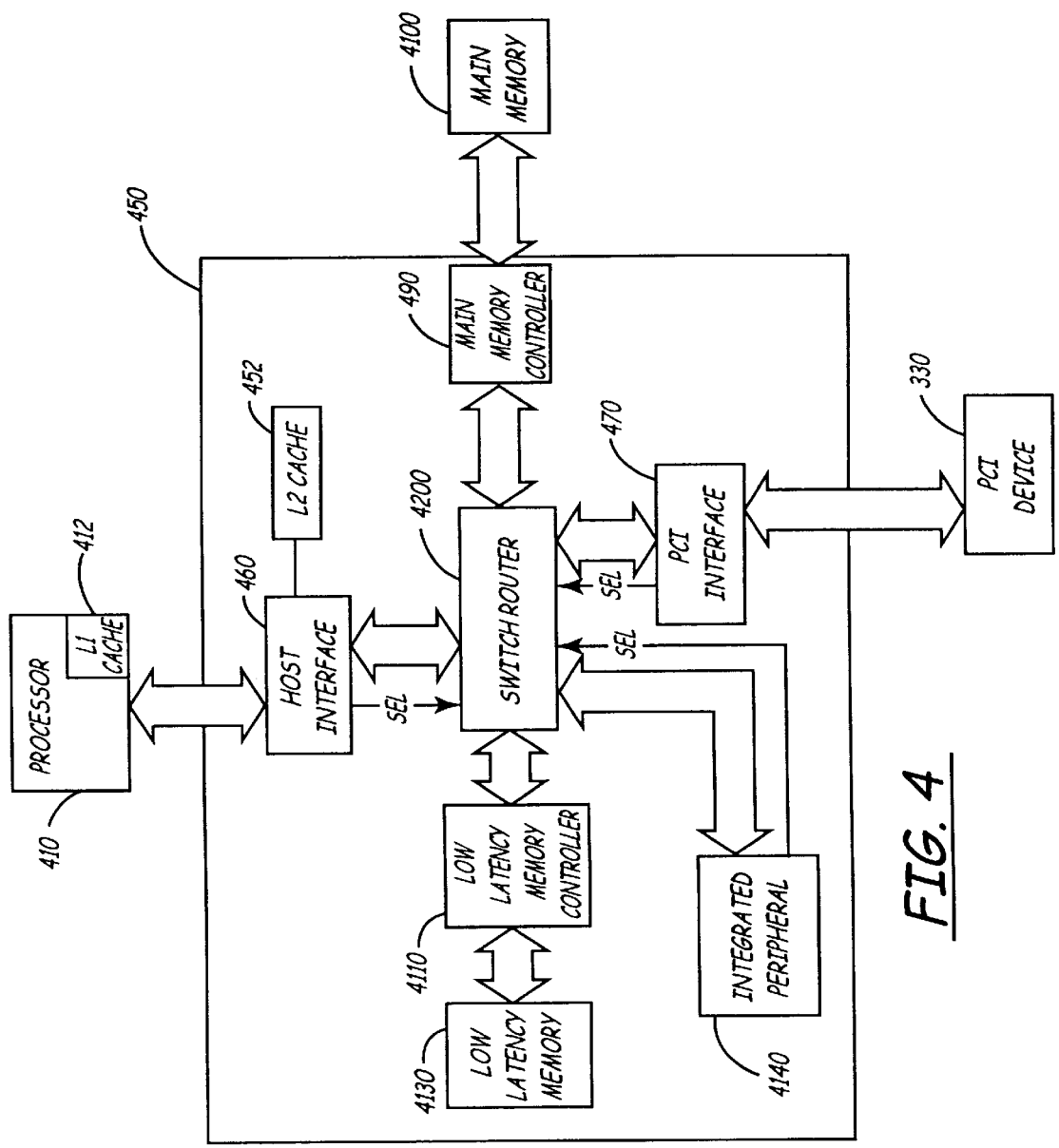
FIG. 4 is a block diagram of yet another computer system that uses the present invention.

In FIGS. 3 and 4, there are shown alternative embodiments of computer systems comprising the present invention. Briefly, in FIG. 3, all of the address decoding functions may be performed in a host interface 360. Thus, access requests issued by a processor 310 or a PCI device 330 are provided to the host interface 360 for decoding and accordingly routed to a low latency memory controller 3110 or to main memory controller 390.

Again, in FIG. 4, all of the address decoding functions may be performed in a host interface 460. In this embodiment, however, all routing of address requests and data associated with address requests is performed by a central switch or router 4200.

In both of these alternative embodiments the low latency memory 3130 (FIG. 3) or 4130 (FIG. 4) is integrated on the same chip as the other components of the system controller 350 (FIG. 3) or 450 (FIG. 4). Thus, the low latency benefits afforded by such a configuration (as discussed above) are essentially equally available in these embodiments.

5.3 Remarks

It may be seen that one advantage of the present invention is an increase in computer system throughput. By configuring the memory subsystem such that a subset (i.e., the low latency memory 130) of the main memory 100 is an integral component of the system controller 50 and physically distinct from the main memory 100, and such that this subset of main memory 100 is noncacheable, latency in accessing that subset and average latency of the entire memory subsystem is reduced. By reducing latency in accessing the memory subsystem, the number of computer operations or transactions that are interrupted, stalled or have wait states inserted is reduced. This may result in time and cost savings.

It may be seen that another advantage of the present invention is an increase in the versatility of the memory subsystem. In the present invention the low latency memory 130 is accessible by not only the embedded peripheral 140, but also the processor 10 and external peripheral 30.

The present invention may provide particular advantages in the following computer operations or tasks.

In some computer systems of the general kind shown in FIG. 1, a peripheral device (such as a PCI-based device) may assert a "busy bit" indicating that the peripheral is performing a transaction. This busy bit is typically stored in a noncacheable memory space within the main memory. The processor 10 must periodically access or poll the address of the busy bit to determine when the peripheral device has completed the transaction. As discussed, each of these repeated accesses to memory has inherent latency, thereby reducing computer system throughput. Additionally, the repeated polling of the main memory increases main memory bus utilization which effectively reduces the bandwidth of the main memory bus. By storing the busy bit in the low latency memory, the latency in these processor polling operations may be reduced and the main memory bus may be more effectively utilized.

In other computer systems, the busy bit or a similar indication that the peripheral device is performing a transaction (referred to as a semaphore) may be stored in the L2 cache. This scheme eliminates the need for the processor to access main memory when polling the status of the peripheral. However, because the semaphore is stored in L2 cache, a snoop phase must be implemented which adds latency to the system. By storing the semaphore in the low latency memory, the snoop phase may be eliminated and latency may be reduced.

In still other computer systems, because the processor and the peripheral may be concurrently "competing" for access to the main memory, buffering may be provided at the peripheral for storing data and information while the processor has access to the main memory bus. The amount of buffering at the peripheral must compensate for the inherent latency involved in main memory accesses by the processor. In other words, the more latency inherent in a main memory access, the more buffering that will be required at the peripheral. Thus reducing latency in a subset of main memory accesses, may result in a corresponding reduction in the amount of buffering required at a peripheral.

It will be appreciated by those of ordinary skill in the art that numerous variations of the present invention will be possible without departing from the inventive concept described herein. Accordingly, it is the claims set forth below, and not the foregoing description, which define the exclusive rights claimed in this application.

What is claimed is:

1. In a computer system, a method for operating a memory subsystem that implements a general purpose address space for a CPU and at least one other memory access requesting agent of the computer system, comprising:

selecting a unique subset of the address space to make low latency as compared to the latency of a main memory;

implementing the low latency subset of the address space in physical storage within the computer system that is physically distinct from the main memory that implements a majority of the address space and that has at least one associated cache that requires a snoop phase;

configuring the low latency subset as non-cacheable memory; and addressing the low latency subset using the same address bus as main memory but excluding the snoop phase.

2. The method of claim 1, further comprising implementing the low latency subset as DRAM.

3. The method of claim 1, further comprising implementing the low latency subset as SRAM.

4. The method of claim 1, wherein the act of implementing the low latency subset within the computer system comprises integrating the low latency subset on a system controller.

5. A method for improving the average latency for access to a memory subsystem that implements a general purpose address space for a CPU and at least one other memory access requesting agent, comprising:

selecting a unique subset of the address space to make low latency as compared to the latency of a main memory;

providing the main memory for the majority of the address space with at least one associated cache that requires a snoop phase;

implementing the low latency subset of the address space in physical storage within the computer system such that a first address request issued to the low latency subset will on average have a lower decoding latency than a second request that is issued to main memory; and configuring the low latency subset as non-cacheable memory requiring no snoop phase for its addressing.

6. The method of claim 5, further comprising implementing the low latency subset as DRAM.

7. The method of claim 5, further comprising implementing the low latency subset as SRAM.

8. A method for accessing a memory subsystem that implements a general purpose address space for a CPU and at least one other memory access requesting agent of a computer system, comprising:

selecting a unique subset of the address space to make low latency as compared to the latency of a main memory;

integrating the low latency subset of the address space within the computer system such that the low latency subset is non-cacheable and physically distinct from the main memory implementing a majority of the address space and having at least one associated cache that requires a snoop phase and such that a memory access request directed to the low latency subset has lower average decode latency than a memory access request directed to the main memory;

initiating a memory access request, determining whether the memory access request is directed to the low latency subset; and responsive to the determination, accessing the low latency subset in memory that is physically distinct from the main memory without using a snoop phase.

9. The method of claim 8, further comprising storing in the low latency subset data that is subject to polling by a processor.

10. The method of claim 8, further comprising implementing the low latency subset as DRAM.

11. The method of claim 8, further comprising implementing the low latency subset as SRAM.

12. The method of claim 8, further comprising implementing the low latency subset as EDO DRAM.

13. The method of claim 8, further comprising implementing the low latency subset as BEDO DRAM.

14. The method of claim 8, further comprising implementing the low latency subset as VRAM.

15. The method of claim 8, further comprising implementing the low latency subset as ROM.

16. The method of claim 8, further comprising implementing the low latency subset as EEPROM.

17. The method of claim 8, further comprising implementing the low latency subset as EPROM.

18. The method of claim 8, further comprising integrating the low latency subset as part of a system controller.

19. The method of claim 8, wherein the computer system comprises an embedded peripheral, and the method further comprises limiting storage of data and information required by the embedded peripheral to storage in the low latency subset.

20. The method of claim 19, further comprising integrating the embedded peripheral and the low latency memory on the same chip.

* * * * *

UNITED STATES PATENT AND TRADEMARK OFFICE
CERTIFICATE OF CORRECTION

PATENT NO.    : 6,397,299 B1
DATED         : May 28, 2002
INVENTOR(S)   : James W. Meyer It is certified that error appears in the above-identified patent and that said Letters Patent is hereby corrected as shown below:

<u>Title page,</u>
Item [22], Filing Date, reads "Feb. 21, 1998" should read -- Jan. 21, 1998 --

Signed and Sealed this

Twenty-third Day of March, 2004

JON W. DUDAS
*Acting Director of the United States Patent and Trademark Office*